United States Patent
Rozeboom et al.

(10) Patent No.: US 7,212,817 B2
(45) Date of Patent: May 1, 2007

(54) PARTITIONING A DATABASE KEYED WITH VARIABLE LENGTH KEYS

(75) Inventors: Paul L. Rozeboom, Omaha, NE (US); John I. Ayers, Omaha, NE (US); John Brichacek, Waterloo, NE (US); Rob W. Heldenbrand, Omaha, NE (US); Bradley T. Kenyon, Omaha, NE (US); Michael R. Kelly, Omaha, NE (US); Sharon Lim, Plano, TX (US); Mark A. Montz, Elkhorn, NE (US); Mark R. Nielson, Elkhorn, NE (US); John H. Pineda, Ohama, NE (US); Nabil F. Salama, Omaha, NE (US); Georg T. Trimborn, Skokie, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 462 days.

(21) Appl. No.: 10/426,317

(22) Filed: Apr. 30, 2003

(65) Prior Publication Data

US 2004/0220929 A1 Nov. 4, 2004

(51) Int. Cl.
*H04Q 7/24* (2006.01)
*G06F 17/30* (2006.01)

(52) U.S. Cl. .......................... 455/433; 707/2
(58) Field of Classification Search ............... 707/1–2, 707/6–7, 100, 9, 101; 455/433, 3.01, 432.1
See application file for complete search history.

(56) References Cited

U.S. PATENT DOCUMENTS

| | | | | |
|---|---|---|---|---|
| 5,854,982 A | * | 12/1998 | Chambers et al. | 455/445 |
| 5,881,235 A | * | 3/1999 | Mills | 709/221 |
| 5,924,035 A | * | 7/1999 | Joensuu | 455/445 |
| 5,924,091 A | * | 7/1999 | Burkhard | 707/7 |
| 6,388,586 B1 | | 5/2002 | Fischer et al. | |
| 6,445,929 B2 | | 9/2002 | Chandnani et al. | |
| 6,496,830 B1 | | 12/2002 | Jenkins, Jr. | |
| 6,819,918 B2 | * | 11/2004 | Chin et al. | 455/411 |
| 6,857,075 B2 | * | 2/2005 | Patel | 713/171 |
| 2002/0101996 A1 | * | 8/2002 | Takada et al. | 380/277 |
| 2003/0033278 A1 | * | 2/2003 | Abe et al. | 707/1 |
| 2003/0084057 A1 | * | 5/2003 | Balogh | 707/100 |
| 2004/0117600 A1 | * | 6/2004 | Bodas et al. | 712/210 |

FOREIGN PATENT DOCUMENTS

| | | |
|---|---|---|
| EP | 1302873 | 4/2003 |
| JP | 10143526 | 5/1998 |

* cited by examiner

*Primary Examiner*—Cheryl Lewis

(57) ABSTRACT

Systems, methods, and devices for a database are provided. One database embodiment includes a set of executable instructions operable on the database. One or more database partitions are provided, each having a defined key range. The set of executable instructions is operable to reverse octets in variable length keys. A last digit in an odd-length key value, plus a pad, is placed in a dedicated octet to partition the variable length keys in the one or more database partitions.

30 Claims, 3 Drawing Sheets

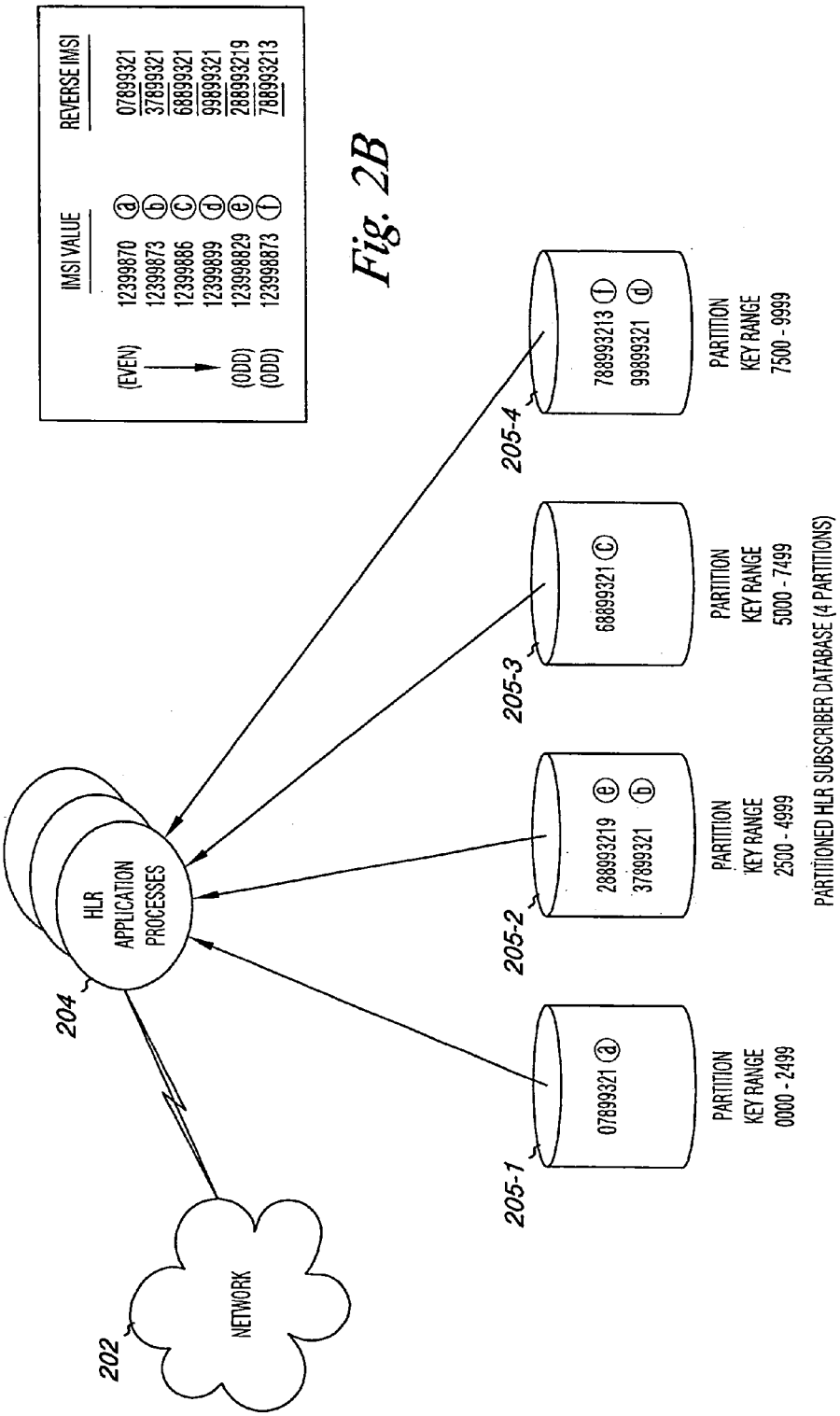

SUBS OR REVERSE KEY FOR A KEY TYPE 0 (10 DIGIT MIN)

| OCTET 1 | OCTET 2 | OCTET 3 | OCTET 4 | OCTET 5 | OCTET 6 | OCTET 7 | OCTET 8 | OCTET 9 | OCTET 10 |
|---------|---------|---------|---------|---------|---------|---------|---------|---------|----------|
| D9 D10  | D7 D8   | D5 D6   | D3 D4   | D1 D2   | 0 0     | 0 0     | 0 0     | 0 0     | 0000 1010 |

*Fig. 3A*

SUBS OR REVERSE KEY FOR AN ODD-LENGTH KEY TYPE 1 WITH 11 DIGITS (11 DIGIT IMSI)

| OCTET 1 | OCTET 2 | OCTET 3 | OCTET 4 | OCTET 5 | OCTET 6 | OCTET 7 | OCTET 8 | OCTET 9 | OCTET 10 |
|---------|---------|---------|---------|---------|---------|---------|---------|---------|----------|
| D10 D9  | D8 D7   | D6 D5   | D4 D3   | D2 D1   | 0 0     | 0 0     | 0 0     | F D11   | 0010 1011 |

*Fig. 3B*

SUBS OR REVERSE KEY FOR AN EVEN-LENGTH KEY TYPE 1 WITH 14 DIGITS (14 DIGIT IMSI)

| OCTET 1 | OCTET 2 | OCTET 3 | OCTET 4 | OCTET 5 | OCTET 6 | OCTET 7 | OCTET 8 | OCTET 9 | OCTET 10 |
|---------|---------|---------|---------|---------|---------|---------|---------|---------|----------|
| D13 D14 | D11 D12 | D9 D10  | D7 D8   | D5 D6   | D3 D4   | D1 D2   | 0 0     | 0 0     | 0010 1110 |

*Fig. 3C*

SUBS OR REVERSE KEY FOR AN ODD-LENGTH KEY TYPE 1 WITH 15 DIGITS (15 DIGIT IMSI)

| OCTET 1 | OCTET 2 | OCTET 3 | OCTET 4 | OCTET 5 | OCTET 6 | OCTET 7 | OCTET 8 | OCTET 9 | OCTET 10 |
|---------|---------|---------|---------|---------|---------|---------|---------|---------|----------|
| D14 D13 | D12 D11 | D10 D9  | D8 D7   | D6 D5   | D4 D3   | D2 D1   | 0 0     | F D15   | 0010 1111 |

*Fig. 3D*

PARTITIONING A DATABASE KEYED WITH VARIABLE LENGTH KEYS

INTRODUCTION

A Public Switched Telephony Network (PSTN) refers to the public phone networks as known by those of ordinary skill in the art. The PSTN is composed of switches and T1/E1 trunks, central office, etc. The PSTN uses circuit-switched technology, in which necessary resources are allocated (dedicated) for the duration of a phone call. An IP network (e.g., the Internet), in contrast, is composed of nodes of computers, serves, routers, and communications links, etc. The IP network employs packet-switching technology that decomposes data (e.g., voice, web pages, e-mail messages, etc.) into IP packets. Each packet is then transmitted over an IP network to a destination identified by an IP address and reassembled at the destination. An IP transmission is completed without pre-allocating resources from point to point.

As one of ordinary skill in the art will appreciate upon reading this disclosure, a wireless infrastructure can provide cellular/PCS services like call origination and call delivery for a roaming mobile device or handset. For call delivery, a visited network tracks the location of a roaming user and a Visitors Location Register (VLR) reports that location information via a control network to the Home Location Register (HLR) of the home network. Control networks may include ANSI-41 and GSM MAP types of networks. An Authentication Center (AC) in a home network can be used for user registration and authentication, e.g., checking to see, among other things, if the user has made payments. When a call is relayed from the Public Switched Telephony Network (PSTN) to the home MSC is to be delivered to a subscriber, the home Mobile Switching Center (MSC) consults the HLR to determine the current whereabouts of the current VLR, and the call is then directed via links and the PSTN to the visited Mobile Switching Center (MSC) currently serving the mobile device.

Accordingly, whenever a telecommunications subscriber dials a telephone number for the mobile device, the HLR is queried by the mobile network to determine the current location of the mobile device. Utilizing the stored network address in HLR representing the serving MSC, the HLR requests a roaming number from the serving MSC in response to the receipt of the query signal. The roaming number provided by the serving MSC is then used by the telecommunications network to route the incoming signal towards the serving MSC. The serving MSC then pages the mobile device and accordingly establishes a speech connection with the mobile device, if available.

If the mobile device roams out of serving MSC coverage area and into another MSC coverage area, MSC will hand-off the communication to MSC and base station. To ensure compatibility between two MSCs, the procedures and protocol for the format and transmission of messages have been standardized. For an identification of industry standards relating to these communications, reference is made to ANSI/TIA/EIA Standard 41, "Cellular Radio telecommunications Intersystem Operations." The format for messages between two MSCs, as specified by ANSI/TIA/EIA-41, is an 8-octet structure.

In an International Mobile Subscriber Identity (IMSI) environment messages may be specified as a 10-octet structure, or greater. Each octet represents a byte, or 8 bits of data represented in Hexadecimal form. In the IMSI architecture/network, the IMSI key type will support number digit lengths from 6 to 18. Such numbers are stored upon databases within a network for use in providing mobile service. A database may include multiple disk drives to store the volume of IMSI numbers.

BRIEF DESCRIPTION OF THE DRAWINGS

FIG. 2A illustrates an embodiment of a database interfaced with a network.

FIG. 2B illustrates a table of IMSI values, even and odd length, and their corresponding reverse IMSI values which can be used in various embodiments to key a database.

FIGS. 3A–3D illustrate embodiments of data structures represented as a series of octets for variable length keys.

DETAILED DESCRIPTION

Figure 1:
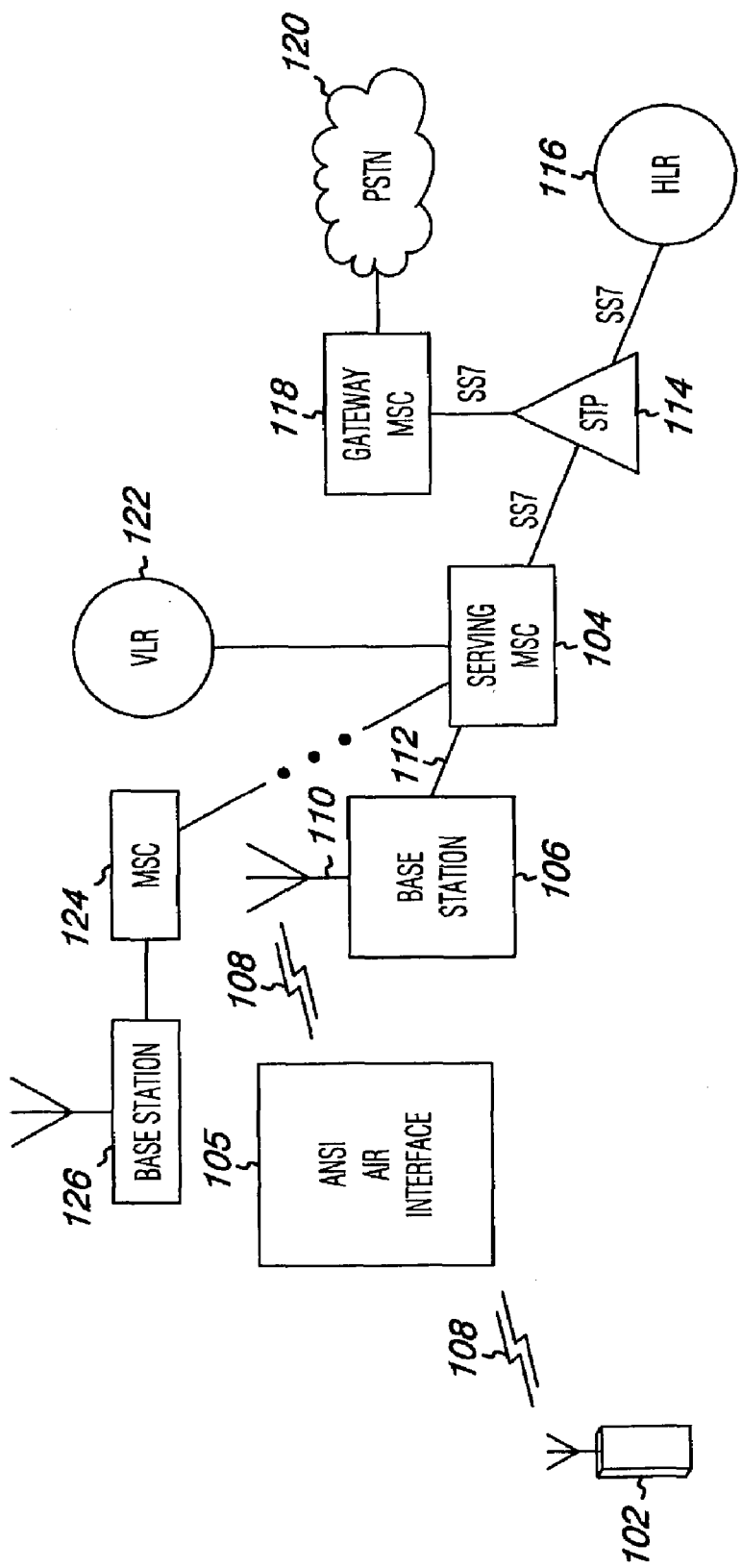
FIG. 1 is a block diagram of an embodiment of a wireless subscriber network.

Embodiments of the present invention provide for more evenly distributing data in a database keyed by variable length keys. As one of ordinary skill in the art will appreciate, an IMSI and similar mobile identifiers, e.g. mobile identification numbers (MINs), can be used as a primary key for a database. An IMSI and similar mobile identifiers can have a dense distribution over the front several octets. Thus, using such numbers as a primary key to a database can create an un-even partitioning scheme.

Attempts to balance the effects of the dense distribution over the front several octets of a MIN or IMSI number include reversing the order of octets and using the reverse ordered octets for keying the database. This works well when fixed length values are used as the key, e.g. a fixed length key. However, it does not work well, and an un-even partitioning scheme still results, for odd-length or variable length keys.

Stated otherwise, using the front several octets in an odd-length or variable length key can lead to a mis-balanced database, reducing performance. As noted above, the IMSI key length is a variable key length. The IMSI key type will support digit lengths from 6 to 18.

Embodiments of the present invention reverse order octets in odd-length and variable length keys while separately treating a last digit in an odd-length key. In various embodiments, the last digit and a hexadecimal pad value are placed in a particular octet to preserve an even partitioning scheme. By way of example and not by way of limitation, for a nine (9) octet IMSI number odd-length digits will have the last digit plus pad in octet 9 with the remaining octets reversed starting in octet one (1). In various embodiments, partitioning can be uniformly distributed based on the first two octets of the re-configured variable length key.

As one of ordinary skill the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

FIG. 1 is a block diagram of an embodiment of a wireless subscriber network. In FIG. 1 a mobile device or handset 102 is illustrated communicating with a mobile switching center (MSC) 104 such as in a code division multiple access (CDMA) cellular communications system. System configuration and operation of a CDMA cellular communications system is well known to those skilled in the art. Accordingly, detailed information concerning CDMA system configuration and operation is not provided. However, technical information concerning this topic may be obtained by referring to a number of available documents. For example, for a description of the use of CDMA techniques in a multiple access communications system, reference is made to U.S. Pat. No. 4,901,307, entitled "Spread Spectrum Multiple Access Communication System Using Satellite or Terrestrial Repeaters." Furthermore, for a description of the generation of signal waveforms for use in a CDMA communications system, reference is made to U.S. Pat. No. 5,103,459, entitled "System and Method for Generating Signal Waveforms in a CDMA Cellular System" and U.S. Pat. No. 5,883,888, entitled "Seamless Soft Handoff in a CDMA Cellular Communications System." The disclosures of the foregoing references are expressly incorporated by reference herein.

The heart of a typical wireless telecommunications system is the Mobile Switching Center (MSC) that is connected to a plurality of base stations that are dispersed throughout the geographic area serviced by the system. The geographic area serviced by a wireless telecommunications system is partitioned into a number of spatially distinct areas called "cells." Each MSC is responsible for, among other things, establishing and maintaining calls between mobile devices and between a mobile device and a wireline terminal, which is connected to the system via the local and/or long-distance networks. A MSC is a telephone switch specialized for wireless and mobility support. A MSC performs various functions, including mobility management, call handoffs, call admission, call control, resource allocation, and so forth. The call is then relayed from the MSC to base stations and via wireless communications to the mobile device.

In FIG. 1, whenever the mobile device 102 activates or roams into a new MSC coverage area, i.e., the "cell" for which the MSC is responsible, the new MSC becomes the serving MSC. The mobile device transmits its stored subscriber profile to the new serving MSC via a base station (BS) 106. As shown in FIG. 1, the subscriber profile information is transmitted over a radio channel 108 in a format complicate with an air interface standard and detected by an antenna 110 of BS 106.

Base station 106, in turn, transmits at least a portion of the subscriber profile information to the serving MSC 104, such as for example via communication line 112. The procedures and protocol for communication between the base station 106 and the MSC 104 have also been standardized. For an identification of industry standards relating to these communications, reference is made to TIA/EIA/IS634-A, "MSC-BS Interface for Public Wireless Communication Systems." The format for messages between base station 106 and MSC 106 is a variable octet field.

In order to provide mobile service to the newly registered mobile device 102, the serving MSC 104 transmits a Mobile Application Part (MAP) based signal, such as a registration notification signal (IS-41 message) or location update signal (GSM message), to a home location register (HLR) 116 via a signaling link such as a signal transfer point (STP) 114. An STP is a node in the signaling system 7 (SS7) telephone network that routes messages between exchanges and between exchanges and databases that hold subscriber and routing information. An HLR is one such database in a cellular system that contains all the subscribers within the provider's home service area. The data in the HLR is requested and transferred via SS7 to the visitor location register (VLR) in the new area.

In the embodiment of FIG. 1, the STP 114 routes the MAP based signal to a gateway MSC 118. As shown in FIG. 1, the gateway MSC 118 can serve as a network switch for connecting to the public switched telephone network (PSTN) 120. SS7 is the protocol used in the PSTN for setting up calls and providing services. The SS7 network sets up and tears down the call, handles all the routing decisions and supports all modem telephony services, such as local number portability (LNP). LNP allows a telephone subscriber to port his/her phone number when that subscriber relocates to a different region of the country, even when the local area code may be different. The voice switches know as service switching points (SSPs) query service control point (SCP) databases using packet switches known as signal transfer points (STPs).

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties. There is an international version of SS7 standardized by the ITU, and national versions determined by each country. For example, ANSI governs the US standard for SS7, and Telcordia (Bellcore) provides an extension of ANSI for its member companies.

The MAP based signal informs the HLR 116 of the network address associated with the MSC 104 currently serving the mobile device 102 and also request requisite subscriber information for providing mobile service to the roaming mobile device 102. The HLR 116 updates its database to store the network address representing the serving MSC 104 and also copies the requesting subscriber information to a visitor location register (VLR) 122 associated with the serving MSC 104. The network address representing the serving MSC 104 stored in the HLR 116 is later utilized by the mobile network to reroute any incoming call intended for the mobile device 102 to the serving MSC 104.

Accordingly, whenever a telecommunications subscriber dials a telephone number for the mobile device 102, the HLR 116 is queried by the mobile network to determine the current location of the mobile device 102. Utilizing the stored network address in HLR 116 representing the serving MSC 104, the HLR 116 requests a roaming number from the serving MSC 104 in response to the receipt of the query signal. The roaming number provided by the serving MSC 104 is then used by the telecommunications network to route the incoming signal towards the serving MSC 104. The serving MSC 104 then pages the mobile device 102 and accordingly establishes a speech connection with the mobile device 102, if available. If the mobile device 102 roams out of serving MSC 104 coverage area and into another MSC 124 coverage area, MSC 104 will hand-off the communication to MSC 124 and base station 126.

As noted above, an International Mobile Subcriber Identity (IMSI) environment messages may be specified as a 10-octet structure, or greater. Each octet represents a byte, or 8 bits of data represented in Hexidecimal form. In the IMSI architecture/network, the IMSI key type will support number digit lengths from 6 to 18. Such numbers are stored upon databases, e.g. an HLR and/or VLR, within a network for use in providing mobile service. A database may include multiple disk drives to store the volume of IMSI numbers.

FIG. 2A illustrates an embodiment of a database interfaced with a network. The embodiment of FIG. 2A illustrates a mobile control network 202, such as an ANSI-41 and/or GSM MAP type of network, including an interface to a database 204. Database 204 includes one or more sets of computer executable instructions, software, and/or application modules for managing and partitioning data within database 204. In the embodiment of FIG. 2A the database is an HLR 204. The invention, however, is not limited to an HLR database. In the embodiment of FIG. 2A, the HLR 204 subscriber database has been partitioned into four key ranges, e.g. 205-1, 205-2, 205-3, and 205-4. The invention however, is not limited to partitioning a database into four key ranges. Fewer or more key range partitions are considered within the scope of the present invention.

In this example embodiment, partition key range 205-1 covers a partition key range of 0000–2499. Partition key range 205-2 covers a partition key range of 2500–4999. Partition key range 205-3 covers a partition key range of 5000–7499. And, partition key range 205-4 covers a partition key range of 7500–9999.

According to embodiments of the present invention, IMSI values can be evenly distributed among these four example partitions, providing for improved performance through easier access. The four partitions in FIG. 2A illustrate each of the partitions having a relatively even distribution of IMSI values.

FIG. 2B illustrates a table of IMSI values, even and odd length, and their corresponding reverse IMSI values which can be used in various embodiments to key a database. In the embodiment of FIG. 2B, a table which, on its left hand side, illustrates ascending numerical IMSI values, beginning even and finishing odd, is provided. The order shown, however, is not required. On the right hand side of the table are shown the reverse IMSI value embodiments corresponding to original IMSI values shown on the left hand side of the table. The IMSI values have been reversed according to embodiments of the present invention.

As noted above, one or more sets of executable instructions are operable on database 204 to perform embodiments of the invention. These embodiments include receiving variable length keys arranged in octets. Receiving variable length keys arranged in octets includes receiving variable length keys wherein each octet includes a pair of hexadecimal values representing digits. The set of executable instructions are operable to reverse order the octets in the received variable length keys. Reverse ordering octets includes reverse ordering octets having a pair of hexadecimal values representing digits. Reverse ordering octets includes reverse ordering octets having significant digit values. In various embodiments, reverse ordering includes reversing the pair of hexadecimal values in each octet.

In various embodiments, reverse ordering the octets includes separately handling a final digit in an odd-length key value. Separately handling a final digit in an odd-length key value includes placing a final significant digit, plus a pad hexadecimal, in a dedicated octet. In various embodiments, placing a final significant digit, plus a pad, in a dedicated octet includes placing the final significant digit plus a pad hexadecimal value in a final octet, preceding a type and length byte. The set of executable instructions are further operable to spread partition the reverse ordered octets across one or more memory locations each having a defined key range, e.g. partition key ranges, e.g. 205-1, 205-2, 205-3, and 205-4.

FIGS. 3A–3D illustrate embodiments of data structures represented as a series of octets for variable length keys. That is, FIGS. 3A–3D illustrate a variable length keys, such as an international mobile subscriber identity (IMSI) number, represented by 10 octets. As one of ordinary skill in the art will appreciate an octet is a telecommunications term for a byte.

In the embodiment of FIG. 3A a reverse key for a Key Type 0, 10 digit MIN is illustrated. As shown in the embodiment of FIG. 3A, octet 1 represents digit 9 and digit 10 of a MIN. Octet 2 represents digit 7 and digit 8, in that order. Octet 3 represents digit 5 and digit 6, in that order. Octet 4 represents digit 3 and digit 4, in that order. Octet 5 represents digit 1 and digit 2, in that order. Since a MIN typically consists of only 10 digits, Octets 6 through 9 includes unused digits, represented in this example by 0. Octet 10 represents a type and length byte.

In the embodiment of FIG. 3B a reverse key for a Key Type 1, 11 digit IMSI is illustrated. As shown in the embodiment of FIG. 3B, Octet 1 represents digit 10 and digit 9, in that order. Octet 2 represents digit 8 and digit 7 in that order. Octet 3 represents digit 6 and digit 5, in that order. Octet 4 represents digit 4 and digit 5, in that order. Octet 5 represents digit 2 and digit 1, in that order. Octets 6 through 8 include unused digits, represented in this example by 0. Octet 9 includes a hexadecimal pad value in the high order nibble of the hexadecimal pair, and a last digit, e.g. digit 11, in the low order nibble of the hexadecimal pair for the odd-length key value. Octet 10 illustrates a type and length octet, or byte.

As used herein, the left four most bits represented by a hexadecimal value are referred to as the high order nibble and the right four most bits in a hexadecimal value are referred to as the low order nibble. And as used herein, the left four most bits are also referred to as a first one of a hexadecimal pair that represents 8 binary bits. The right four most bits are also referred to as a second one of the hexadecimal pair.

In the embodiment of FIG. 3C a reverse key for a Key Type 1, 14 digit IMSI is illustrated. As shown in the embodiment of FIG. 3C, Octet 1 represents digit 14 and digit 13, in that order. Octet 2 represents digit 12 and digit 11, in that order. Octet 3 represents digit 10 and digit 9, in that order. Octet 4 represents digit 8 and digit 7, in that order. Octet 5 represents digit 6 and digit 5, in that order. Octet 6 represents digit 4 and digit 3, in that order. Octet 7 represents digit 2 and digit 1, in that order. Octets 8 and 9 include unused digits, represented by 0's. Octet 10 illustrates a type and length byte.

In the embodiment of FIG. 3D a reverse key for a Key Type 1, 15 digit IMSI is illustrated. As shown in the embodiment of FIG. 3D, Octet 1 represents digit 14 and digit 13, in that order. Octet 2 represents digit 12 and digit 11, in that order. Octet 3 represents digit 10 and digit 9, in that order. Octet 4 represents digit 8 and digit 7, in that order. Octet 5 represents digit 6 and digit 5, in that order. Octet 6 represents digit 4 and digit 3, in that order. Octet 7 represents digit 2 and digit 1, in that order. Octet 8 includes usused digits, represented by 0's. Octet 9 includes a hexadecimal pad value in the high order nibble of the hexadecimal pair, and a last digit, e.g. digit 15, in the low order nibble of the hexadecimal pair for the odd-length key value. Octet 10 illustrates a type and length byte.

As noted above, the IMSI Key Type will support digit lengths from 6 to 18. According to various embodiments of the invention, odd-length IMSI values will have the last digit plus a pad hexadecimal in Octet 9 with the remaining octets reversed starting in Octet 1 so that partitioning can be uniformly distributed based on the first two octets of this key.

Partitioning of a subscriber file can be done based on Octet 1 and 2. For a subscriber record that has a mobile identity number (MIN) as the primary key, e.g. 10 digits, digits D9, D10, D7, D8 can consistently be used for partitioning. However, for a subscriber record that has IMSI as the primary key, since the IMSI has variable length, partitioning varies based on what digits are in Octet 1 and 2.

The placement of digits in Octet 1 and 2 is determined according to the embodiments as have been described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A home location register (HLR), comprising:
   a processor;
   a memory connected to the processor and having a set of executable instructions stored thereon;
   a HLR database having one or more HLR database partitions each having a defined key range; and
   wherein the set of executable instructions are executed by the processor to:
      receive variable length keys;
      reverse order octets from a received order in the received variable length keys, wherein a last digit in an odd-length key value, plus a pad, are placed in a last octet to partition and store the variable length keys in the one or more HLR database partitions.

2. The HLR of claim 1, wherein each octet includes a pair of digits represented in hexadecimal values.

3. The HLR of claim 1, wherein variable length keys include international mobile subscriber identity (IMSI) key types, and wherein the HLR database is keyed using the IMSI key types as the primary keys.

4. The HLR of claim 1, wherein the one or more HLR database partitions include one or more distinct disk drives.

5. A home location register (HLR) for a mobile subscriber, comprising:
   a computer readable medium having a set of executable instructions stored thereon operable on variable length international mobile subscriber identity (IMSI) key types arranged in octets when executed by a processor associated with the HLR;
   one or more HLR database locations each having a defined key range; and
   wherein the set of executable instructions are executed by the processor to:
      receive variable length IMSI key types arranged in octets;
      reverse an octet order for those octets having digit values in the variable length IMSI key types while placing a last digit in an odd-length key value, plus a pad, in an end octet, preceding a type and length byte, to partition and store the variable length IMSI key types in the one or more HLR database locations.

6. The HLR of claim 5, wherein each octet in the variable length IMSI key types includes a pair of digits represented as binary coded decimal (BCD) values.

7. The HLR of claim 6, wherein the set of executable instructions are executed by the processor to reverse digit order for the pair of digits within each octet.

8. A system for a mobile subscriber including a home location register (HLR), comprising:
   a processor;
   a memory connected to the processor having a set of executable instructions stored thereon;
   one or more HLR database locations each having a defined key range:
   wherein the set of executable instructions are executed by the processor to reverse order variable length keys to spread partition and store the variable length keys across the one or more HLR database locations; and
   wherein the variable length keys include a series of octets, wherein each octet includes a pair of hexadecimal values representing digits, and wherein the set of executable instructions are executed by the processor to reverse an order of those octets having significant digit values.

9. The system of claim 8, wherein the set of executable instructions are executed by the processor to reverse an order of those octets having significant digit values while placing a last significant digit in an odd-length key value, plus a pad, in an end octet.

10. The system of claim 9, wherein the set of executable instructions are executed by the processor to reverse the pair of hexadecimal values in each octet.

11. The system of claim 8, wherein the set of executable instructions are executed by the processor to receive international mobile subscriber identity (IMSI) numbers as variable length keys.

12. A computer readable medium having computer executable instructions stored thereon which when executed by a processor cause a device to perform a method, comprising:
   receiving variable length keys arranged in octets to an HLR;

reverse ordering the octets in the received variable length keys and storing the reverse ordered octets on an HLR database; and wherein reverse ordering the octets includes separately handling a final digit in an odd-length key value.

13. The computer readable medium of claim 12, wherein receiving variable length keys arranged in octets includes receiving variable length keys wherein each octet includes a pair of hexadecimal values representing digits.

14. The computer readable medium of claim 12, wherein separately handling a final digit in an odd-length key value includes placing a final significant digit, plus a pad, in a dedicated octet.

15. The computer readable medium of claim 14, wherein placing a final significant digit, plus a pad, in a dedicated octet includes placing the final significant digit plus a pad hexadecimal value in a final octet.

16. The computer readable medium of claim 15, wherein the medium further includes computer executable instructions which when executed by the processor partition and store the reverse ordered octets across one or more database locations each having a defined key range on the HLR.

17. A computer readable medium having computer executable instructions stored thereon which when executed by a processor perform a method to partition a home location register (HLR) database keyed by variable length keys, the method comprising:

receiving variable length keys arranged in octets to an HLR;

reverse ordering octets in received variable length keys;

separately handling a final digit in an odd-length key value;

partitioning and storing the reverse ordered octets in one or more HLR database locations; and wherein reverse ordering octets in received variable length keys includes reverse ordering octets associated with international mobile subscriber identity (IMSI) numbers.

18. The medium of claim 17, wherein reverse ordering octets includes reverse ordering octets having a pair of hexadecimal values representing digits.

19. The medium of claim 18, wherein reverse ordering octets in received variable length keys includes reversing the pair of hexadecimal values in each octet.

20. The medium of claim 17, wherein reverse ordering octets includes reverse ordering octets having significant digit values.

21. The medium of claim 17, wherein separately handling a final digit in an odd-length key value includes placing a final significant digit, plus a pad, in a dedicated octet.

22. The medium of claim 21, wherein placing a final significant digit, plus a pad, in a dedicated octet includes placing the final significant digit plus a pad hexadecimal value in a final octet.

23. The medium of claim 17, wherein partitioning the reverse ordered octets includes partitioning the reverse ordered octets in one or more HLR database locations each having a defined key range.

24. A data structure in a home location register (HLR) database, comprising:

one or more HLR database locations partition according to a key range;

a variable length key having a series of octets partitioned in an HLR database location by reference to at least a first octet in the variable length key, wherein the first octet in the variable length key results from reverse ordering octets in the variable length key and separating a final digit in an odd-length key value in a dedicated octet; and wherein the data structure is formed by computer executable instructions stored in a memory and executed by a processor of an HLR to:

receive the variable length key;

reverse order octets in the variable length key; and partition and store the reverse ordered octets in the HLR database.

25. The data structure of claim 24, wherein the variable length key having a series of octets is an international mobile subscriber identity (IMSI) number represented by at least 10 octets.

26. The data structure of claim 25, wherein the separated final digit in the odd-length key value is located in an end octet having a pair of hexadecimal values, wherein a high order nibble of the pair includes a pad hexadecimal value and a low order nibble of the pair represents the final digit.

27. The data structure of claim 26, wherein the end octet precedes a type and length byte.

28. The data structure of claim 24, wherein the variable length key is partitioned by reference to a first octet and a second octet resulting from reverse ordering octets in the variable length key.

29. The data structure of claim 24, wherein reverse ordered octets include octets having a significant digit values.

30. The data structure of claim 29, wherein an octet includes a pair of hexadecimal values representing digits, and wherein each reverse ordered octet includes a reverse order to the pair of hexadecimal values.

* * * * *

UNITED STATES PATENT AND TRADEMARK OFFICE
CERTIFICATE OF CORRECTION

PATENT NO. : 7,212,817 B2
APPLICATION NO. : 10/426317
DATED : May 1, 2007
INVENTOR(S) : Paul L. Rozeboom et al.

It is certified that error appears in the above-identified patent and that said Letters Patent is hereby corrected as shown below:

On the face page, in field (75), in "inventors", in column 1, line 10, delete "Ohama" and insert -- Omaha --, therefor.

In column 8, line 39, in Claim 8, delete "range:" and insert -- range; --, therefor, In column 9, line 32, in Claim 17, after "value;" insert -- and --.

Signed and Sealed this

Twenty-ninth Day of September, 2009

David J. Kappos
*Director of the United States Patent and Trademark Office*